US010552803B2

(12) United States Patent
Kuffner, Jr. et al.

(10) Patent No.: US 10,552,803 B2
(45) Date of Patent: *Feb. 4, 2020

(54) SYSTEMS AND METHODS FOR DETERMINING A POTENTIAL FAILURE OR OTHER STATUS OF A ROBOTIC DEVICE

(71) Applicant: X Development LLC, Mountain View, CA (US)

(72) Inventors: James J. Kuffner, Jr., Mountain View, CA (US); Ryan Hickman, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,130

(22) Filed: Oct. 16, 2018

(65) Prior Publication Data

US 2019/0050827 A1 Feb. 14, 2019

Related U.S. Application Data

(63) Continuation of application No. 15/667,005, filed on Aug. 2, 2017, now Pat. No. 10,134,014, which is a
(Continued)

(51) Int. Cl.
*G06Q 10/00* (2012.01)
*G08B 21/18* (2006.01)
(Continued)

(52) U.S. Cl.
CPC ............ *G06Q 10/20* (2013.01); *B25J 9/0084* (2013.01); *B25J 9/1674* (2013.01); *G08B 21/18* (2013.01); *Y10S 901/49* (2013.01)

(58) Field of Classification Search
CPC ....... G06Q 10/20; B25J 9/0084; B25J 9/1674; G08B 21/18
(Continued)

(56) References Cited

U.S. PATENT DOCUMENTS 7,600,593 B2 10/2009 Filippov et al.
8,185,346 B2 5/2012 Sjostrand et al.
(Continued)

FOREIGN PATENT DOCUMENTS

EP 2801935 A1 11/2014
EP 2801938 A1 11/2014

OTHER PUBLICATIONS

Liu, G. "Control of Robot Manipulators with Consideration of Actuator Performance Degradation and Failures." Proceedings 2001 ICRA. IEEE International Conference on Robotics and Automation (Cat. No. 01CH37164).
(Continued)

*Primary Examiner* — Kerri L McNally
(74) *Attorney, Agent, or Firm* — McDonnell Boehnen Hulbert & Berghoff LLP (57) ABSTRACT

Methods and systems for proactively preventing hazardous or other situations in a robot-cloud interaction are provided. An example method includes receiving information associated with task logs for a plurality of robotic devices. The task logs may include information associated with tasks performed by the plurality of robotic devices. The method may also include a computing system determining information associated with hazardous situations based on the information associated with the task logs. For example, the hazardous situations may comprise situations associated with failures of one or more components of the plurality of robotic devices. According to the method, information associated with a contextual situation of a first robotic device may be determined, and when the information associated with the contextual situation is consistent with information associated with the one or more hazardous situations, an alert indicating a potential failure of the first robotic device may be provided.

20 Claims, 8 Drawing Sheets

Related U.S. Application Data continuation of application No. 15/269,649, filed on Sep. 19, 2016, now Pat. No. 9,928,487, which is a continuation of application No. 14/681,878, filed on Apr. 8, 2015, now Pat. No. 9,471,904, which is a continuation of application No. 13/753,729, filed on Jan. 30, 2013, now Pat. No. 9,024,771.

(60) Provisional application No. 61/595,875, filed on Feb. 7, 2012.

(51) Int. Cl.
  *B25J 9/00* (2006.01)
  *B25J 9/16* (2006.01)

(58) Field of Classification Search
  USPC .......................................................... 340/679
  See application file for complete search history.

(56) References Cited

U.S. PATENT DOCUMENTS

| | | | |
|---|---|---|---|
| 8,671,315 B2 | 3/2014 | MacKey et al. | |
| 8,732,260 B2 | 5/2014 | Lewis | |
| 8,930,022 B1 | 1/2015 | Kuffner, Jr. et al. | |
| 9,024,771 B1 | 5/2015 | Kuffner, Jr. et al. | |
| 9,205,560 B1 | 12/2015 | Edsinger et al. | |
| 9,447,849 B1 | 9/2016 | Edsinger et al. | |
| 9,457,985 B1 | 10/2016 | Gallagher | |
| 9,471,904 B2 | 10/2016 | Kuffner, Jr. et al. | |
| 9,505,132 B1 | 11/2016 | Bingham et al. | |
| 9,928,487 B2 | 3/2018 | Kuffner, Jr. et al. | |
| 2005/0206339 A1 | 9/2005 | Yoshida et al. | |
| 2007/0147976 A1 | 6/2007 | Rice et al. | |
| 2010/0138038 A1 | 6/2010 | Moon et al. | |
| 2010/0305758 A1* | 12/2010 | Nishi .................. | B23Q 17/00 700/264 |
| 2011/0046775 A1* | 2/2011 | Bailey ................. | B07C 3/00 700/224 |
| 2011/0054680 A1 | 3/2011 | Nakata et al. | |
| 2011/0313568 A1 | 12/2011 | Blackwell et al. | |
| 2012/0010748 A1 | 1/2012 | Sasai | |
| 2012/0048027 A1* | 3/2012 | Hashiguchi ......... | B25J 9/0087 73/763 |
| 2012/0165780 A1 | 6/2012 | Bazargan et al. | |
| 2013/0275059 A1 | 10/2013 | Bernhard et al. | |
| 2014/0067124 A1 | 3/2014 | Williamson et al. | |
| 2014/0201571 A1 | 7/2014 | Hosek et al. | |
| 2014/0336791 A1 | 11/2014 | Asenjo et al. | |
| 2014/0337000 A1 | 11/2014 | Asenjo et al. | |
| 2014/0358453 A1 | 12/2014 | Kirk | |
| 2015/0227838 A1 | 8/2015 | Wang et al. | |
| 2017/0011360 A1 | 1/2017 | Kuffner, Jr. et al. | |

OTHER PUBLICATIONS

A. Yamada, S. Takata, Reliability Improvement of Industrial Robots by Optimizing Operation Plans Based on Deterioration Evaluation, CIRP Annals-Manufacturing Technology, vol. 51, Issue 1, 2002, pp. 319-322.

Park, Juyi et al, Toward Intelligent System Health Monitoring for NASA Robonaut, 4th IEEE/RAS International Conference on Humanoid Robotics, 2004.

Stancliff, S., et. al., "Towards a Predictive Model of Robot Reliability", CMU-RI-TR-05-38, Robotics Institute, Cameige Mellon University, Aug. 2005.

Lee, Jay, Jun Ni, Dragan Djurdjanovic, Hai Qiu, and Haitao Liao. "Intelligent Prognostics Tools and E-maintenance." Computers in Industry 57.6 (2006): 476-89.

Arumugan, Rajesh et al, DAvinCi: A Cloud Computing Framework for Service Robots, 2010 IEEE Conference on Robotics and Automation, Anchorage Convention District, Anchorage, Alaska, May 3-8, 2010.

International Search Report for related PCT application No. PCT/US2016/021186 dated May 24, 2016.

Non-Final Rejection for U.S. Appl. No. 14/672,706 dated Jun. 7, 2017.

Final Rejection for U.S. Appl. No. 14/672,706 dated Sep. 12, 2017.

Non-Final Rejection for U.S. Appl. No. 14/672,706 dated Dec. 5, 2017.

Notice of Allowance for U.S. Appl. No. 14/672,706 dated Apr. 12, 2018.

* cited by examiner

SYSTEMS AND METHODS FOR DETERMINING A POTENTIAL FAILURE OR OTHER STATUS OF A ROBOTIC DEVICE

CROSS-REFERENCE TO RELATED APPLICATIONS

This application is a continuation of U.S. patent application Ser. No. 15/667,005 filed on Aug. 2, 2017, which is a continuation of U.S. patent application Ser. No. 15/269,649 filed on Sep. 19, 2016, which is a continuation of U.S. patent application Ser. No. 14/681,878 filed on Apr. 8, 2015, which is a continuation of U.S. patent application Ser. No. 13/753,729 filed on Jan. 30, 2013, which in turn claims the benefit of U.S. Provisional Application No. 61/595,875 filed on Feb. 7, 2012, the entire contents of each of which are hereby incorporated by reference.

FIELD

This disclosure relates to robot cloud computing, and in examples, to proactively preventing potentially hazardous or other situations in a robot-cloud interaction.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a client device may be a robotic device configured to perform one or more tasks or functions. In some cases, a computer connected to the cloud may receive information from a plurality of robotic devices performing various functions.

SUMMARY

This disclosure may disclose, inter alia, systems and methods for determining a potential failure or other status of a robotic device in a robot-cloud interaction.

In one example, a method is provided that comprises receiving information associated with task logs for a plurality of robotic devices. The task logs may include information associated with tasks performed by the plurality of robotic devices. The method may also include a computing system, having a processor and a memory, determining information associated with hazardous situations based on the information associated with the task logs. For example, the hazardous situations may include situations associated with failures of one or more components of the plurality of robotic devices. The method may further include determining information associated with a contextual situation of a first robotic device of the plurality of robotic devices. According to the method, an alert indicating a potential failure of the first robotic device may be provided when the information associated with the contextual situation is consistent with information associated with the one or more hazardous situations.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a computer-readable memory having stored thereon instructions executable by a computing device to cause the computing device to perform functions is provided. The functions may comprise determining information associated with task logs for a plurality of robotic devices. The task logs may include information associated with tasks performed by the plurality of robotic devices. The functions may also include determining information associated with hazardous situations based on the information associated with the task logs. For example, the hazardous situations may include situations associated with failures of one or more components of the plurality of robotic devices. The functions may further include determining information associated with a contextual situation of a first robotic device of the plurality of robotic devices. According to the functions, when the information associated with the contextual situation is consistent with information associated with the one or more hazardous situations, an alert indicating a potential failure of the first robotic device may be provided.

The computer readable memory may include a non-transitory computer readable medium, for example, such as computer-readable media that stores data for short periods of time like register memory, processor cache and Random Access Memory (RAM). The computer readable memory may also include non-transitory media, such as secondary or persistent long term storage, like read only memory (ROM), optical or magnetic disks, compact-disc read only memory (CD-ROM), for example. The computer readable memory may also be any other volatile or non-volatile storage systems. The computer readable memory may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In another example, a system is provided that comprises a computing component and a plurality of robotic devices. The computing component may comprise a processor and a memory coupled to the processor. In addition, the computing component is capable of communicating with the plurality of robotic devices over a network.

The computing component may be configured to receive information associated with task logs for the plurality of robotic devices. The task logs may include information associated with tasks performed by the plurality of robotic devices. The computing component may also be configured to determine information associated with hazardous situations based on the information associated with the task logs. For example, the hazardous situations may include situations associated with failures of one or more components of the plurality of robotic devices. The computing component may be further configured to receive information associated with a contextual situation of a first robotic device of the plurality of robotic devices. Furthermore, the computing component may be configured to provide an alert via the network indicating a potential failure of the first robotic device when the information associated with the contextual situation is consistent with information associated with one or more hazardous situations.

The plurality of robotic devices may be configured to transmit via the network information associated with tasks performed by the plurality of robotic devices and information associated with contextual situations of the plurality of robotic devices.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for determining a potential failure or other status of a robotic device. An example method includes receiving information associated with task logs for a plurality of robotic devices. In some instances, the information associated with the task logs may include information associated with tasks performed by the plurality of robotic devices. In one instance, the information associated with the task logs may indicate tasks performed by one or more of the plurality of robotic devices that caused one or more components of a robotic device to malfunction or need repair. In another instance, the information associated with the task logs may indicate where or when a given task was performed. In yet another instance, the information may include an indication of whether a task assigned to a given robotic device was completed.

The example method may also include a computing system, having a processor and a memory, determining information associated with hazardous situations based on the information associated with the task logs. In some examples, the hazardous situations may include situations associated with failures of one or more components of the plurality of robotic devices. For example, an analysis of the information associated with the tasks logs may indicate one or more tasks or environments affecting the failures. Example components may comprise sensors, actuators, processors, motors, wheels, or gears, among other possible components.

In another example, information associated with a health level for the plurality of robotic devices (and/or components of the plurality of robotic devices) may be determined based on the information associated with the task logs. Information associated with respective health levels of the one or more components of the plurality of robotic devices associated with the failures may also be determined.

The method may further include determining information associated with a contextual situation of a first robotic device of the plurality of robotic devices. The information associated with the contextual situation may include, but is not limited to, information associated with an environment in which the first robotic device resides, operates, or is configured to operate, and/or information associated with a health level for one or more components of the first robotic device.

When the information associated with the contextual situation is consistent with information associated with the one or more hazardous situations, an alert indicating a potential failure of the first robotic device may be provided. For example, the alert may be provided to a manager of a fleet of connected robotic devices comprising the plurality of robotic devices. Thus, based on the determined information associated with hazardous situations, in some examples, when a given robotic device is prone to experiencing a failure of one or more components as evidenced by prior failures of components of the plurality of robotic devices, a potential failure of the one or more components may be predicted and/or avoided.

Figure 1:
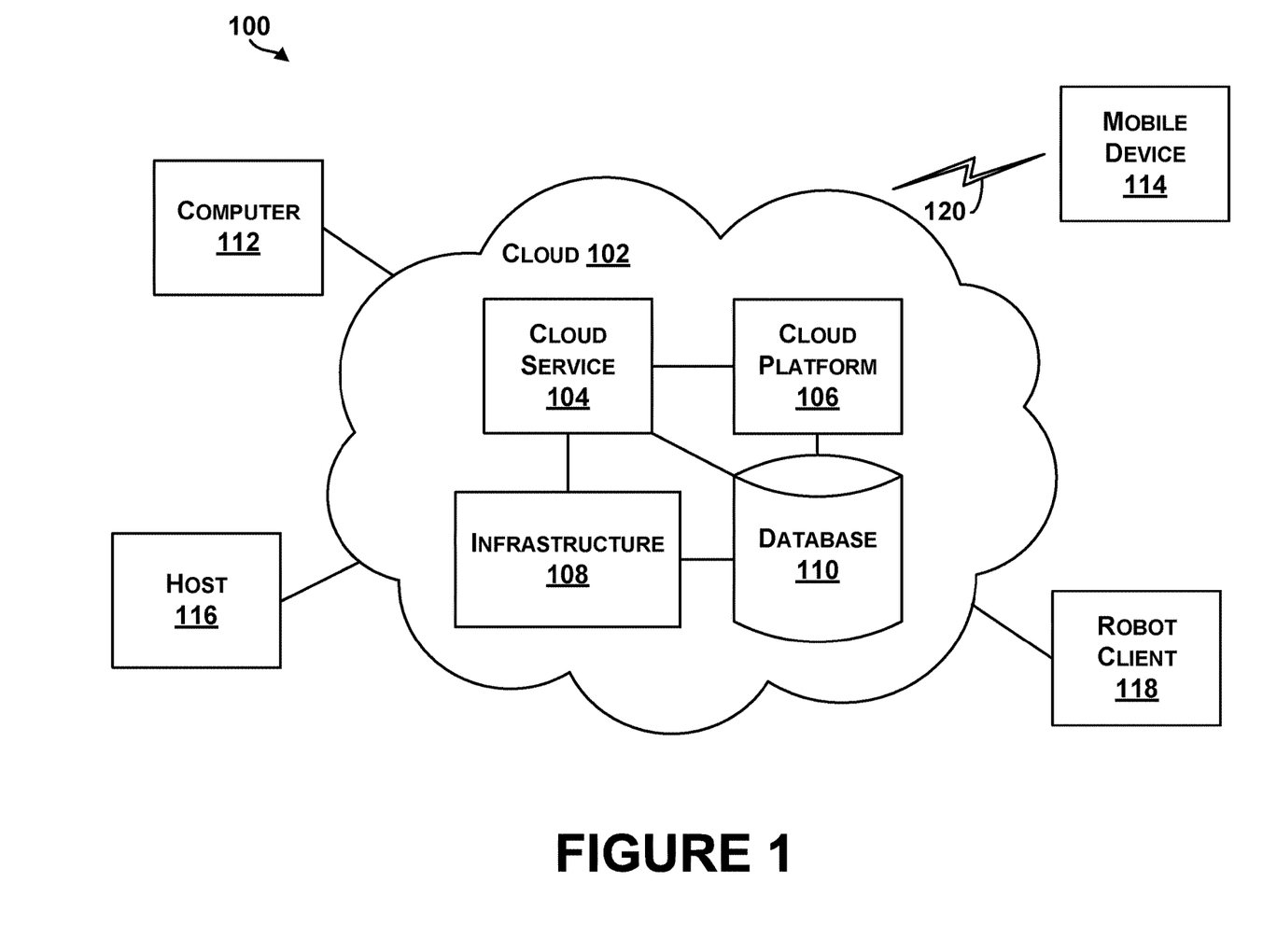
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud-based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, encoders, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
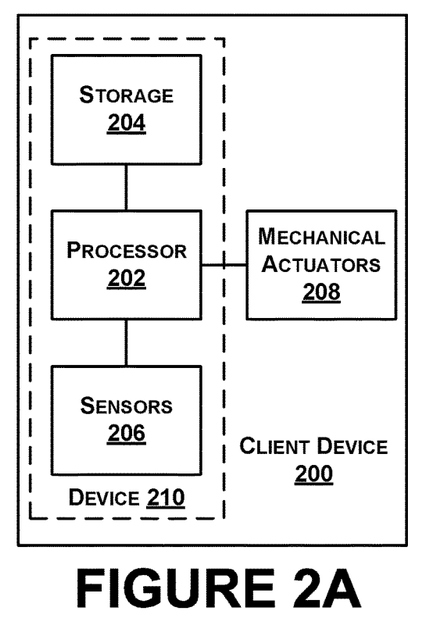
FIGS. 2A-2C are example illustrations of robotic devices.
Figure 2B:
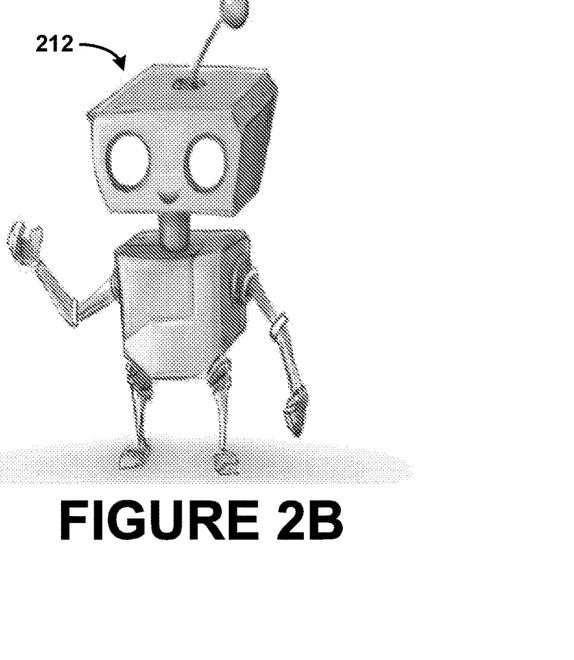
Figure 2C:
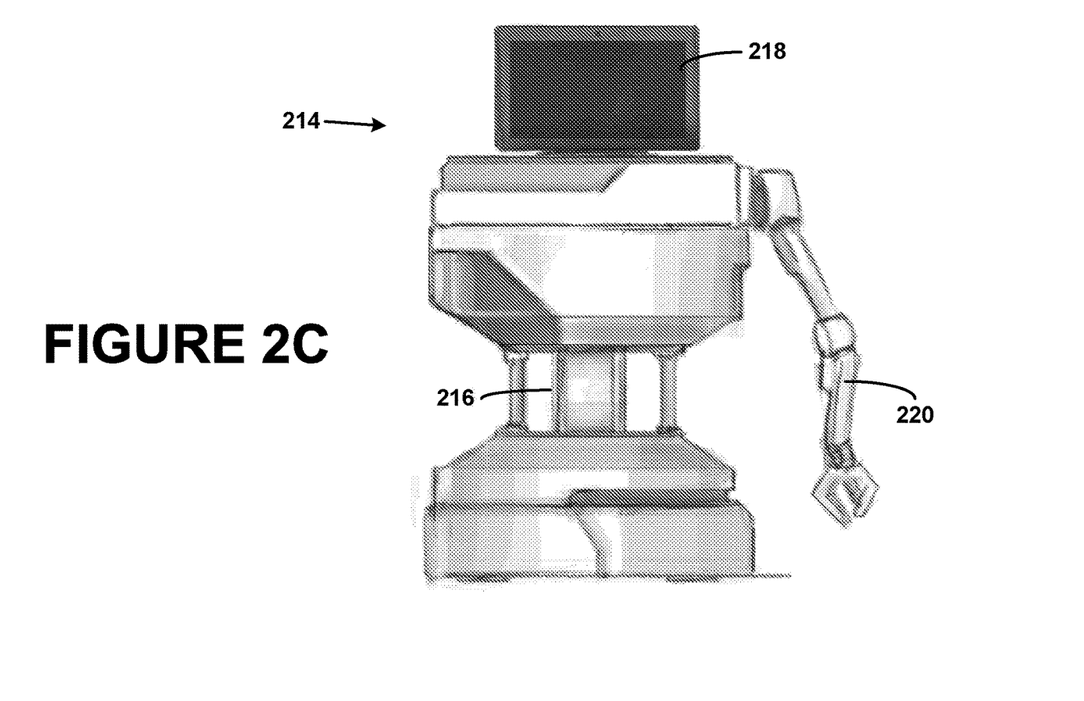

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, encoders, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system), proprietary software, and other examples. A robot operating system may include publish and subscribe functionality, and may also include functionality to control components of the robot, such as head tracking, base movement (e.g., velocity control, navigation framework), etc.

Figure 3:
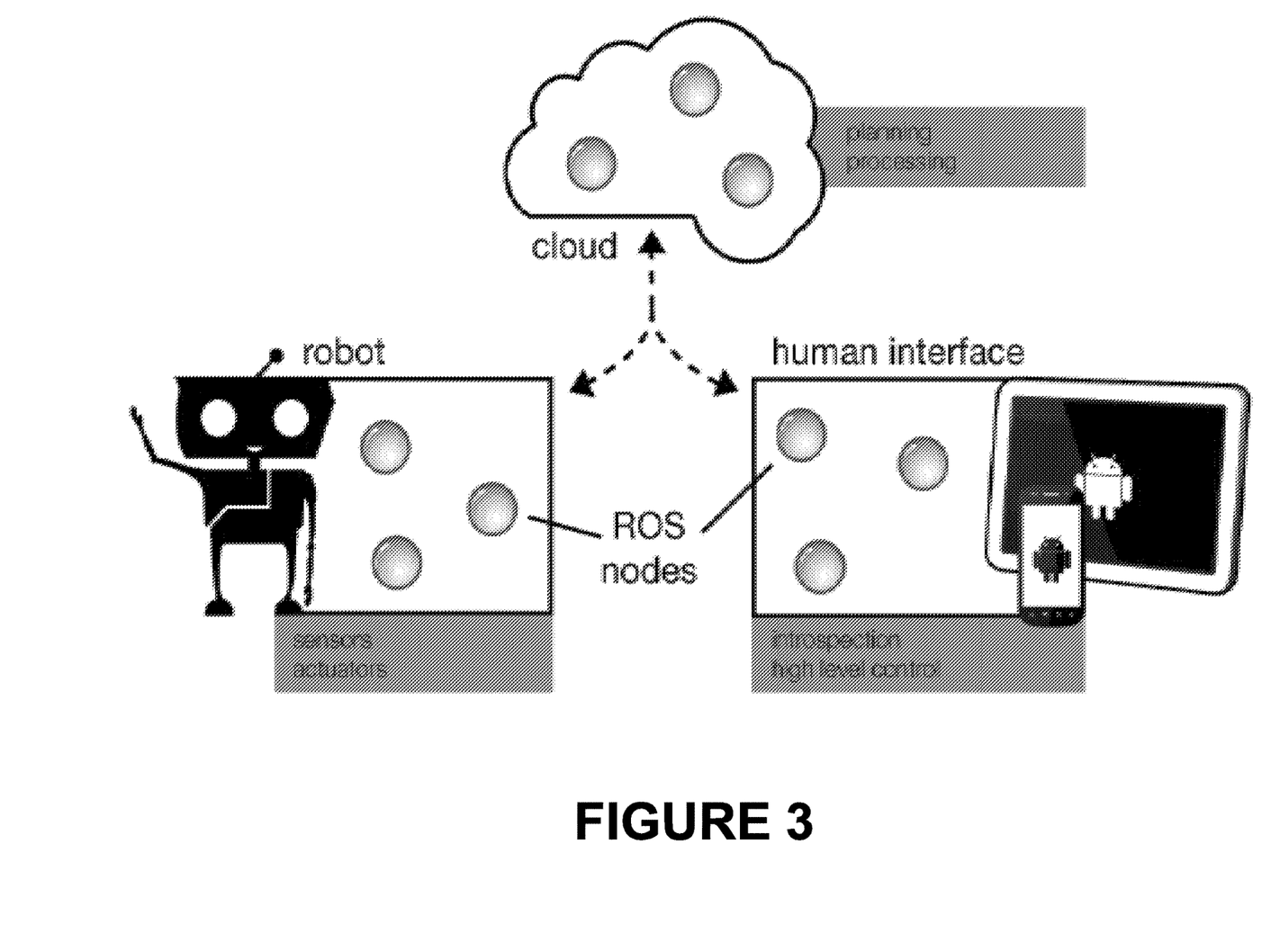
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
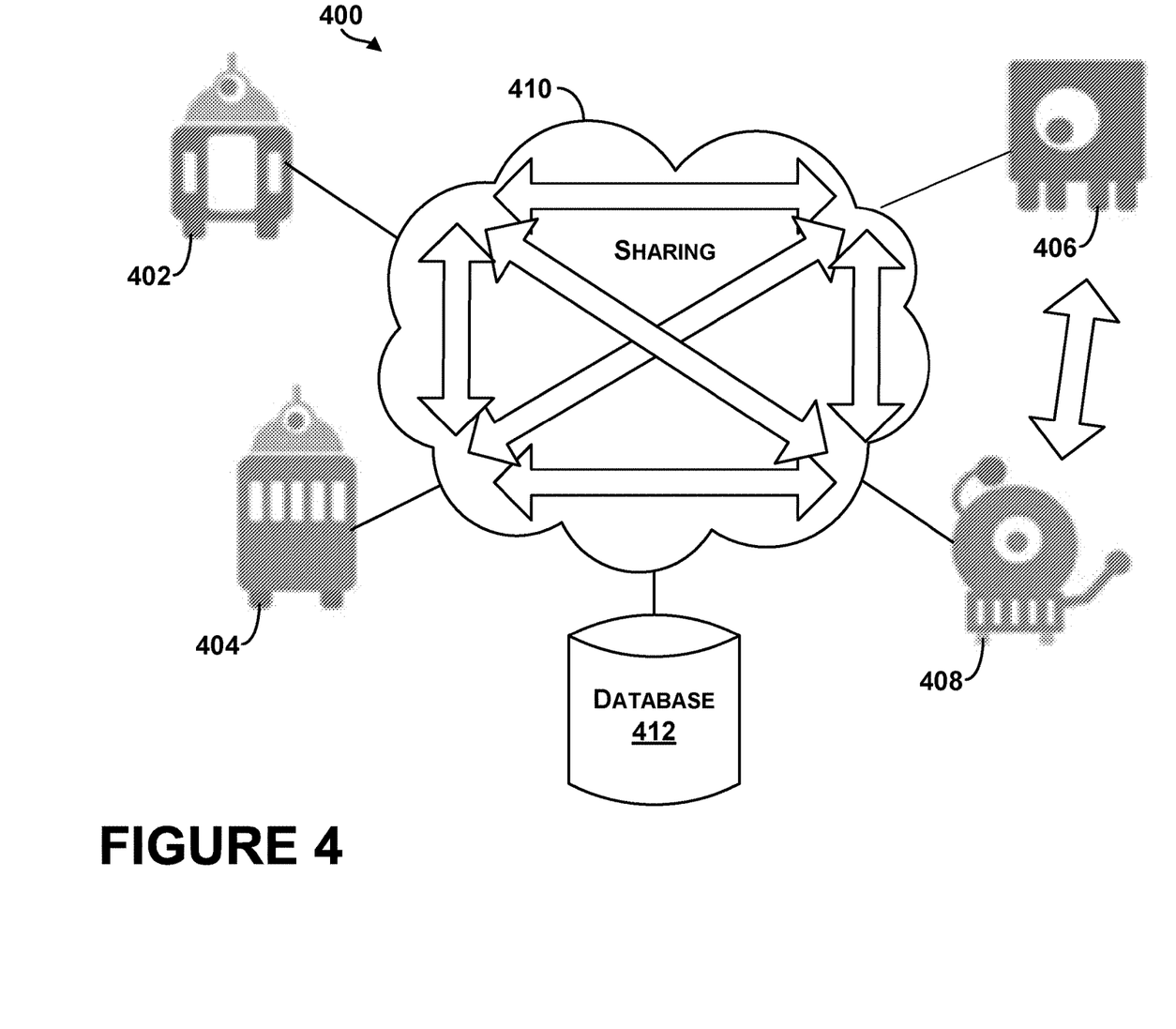
FIG. 4 is an example system in which robotic devices may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Each robot 402, 404, 406, and 408 will have access to real-time, up-to-date data. Overall, the robots 402, 404, 406, and 408 may be configured to share data that is collected to enable faster adaptation, such that each robot 402, 404, 406, and 408 can build upon a learned experience of a previous robot.

The database 412 may be accessible by all robots through the cloud 410 (or alternatively directly accessible by all robots without communication through the cloud 410). The database 412 may thus be a shared knowledge base stored in the cloud 410. In some examples, robots may share learned behaviors through the cloud 410. The cloud 410 may have a server that stores robot learned activities or behaviors resulting in a shared knowledge base of behaviors and heuristics for object interactions (e.g., a robot "app store").

Thus, within examples, the robots 402, 404, 406, and 408 may share information through the cloud 410, and may access the database 412. The robots 402, 404, 406, and 408 may access the cloud 410 to perform any number of functions or methods described herein.

In one example, information associated with tasks or functions performed by the robots may be logged or stored by the robots 402-408 or in the cloud 410. Data analysis of the logs may be performed on the logs to facilitate decisions or actions associated with the robots 402-408.

Figure 5:
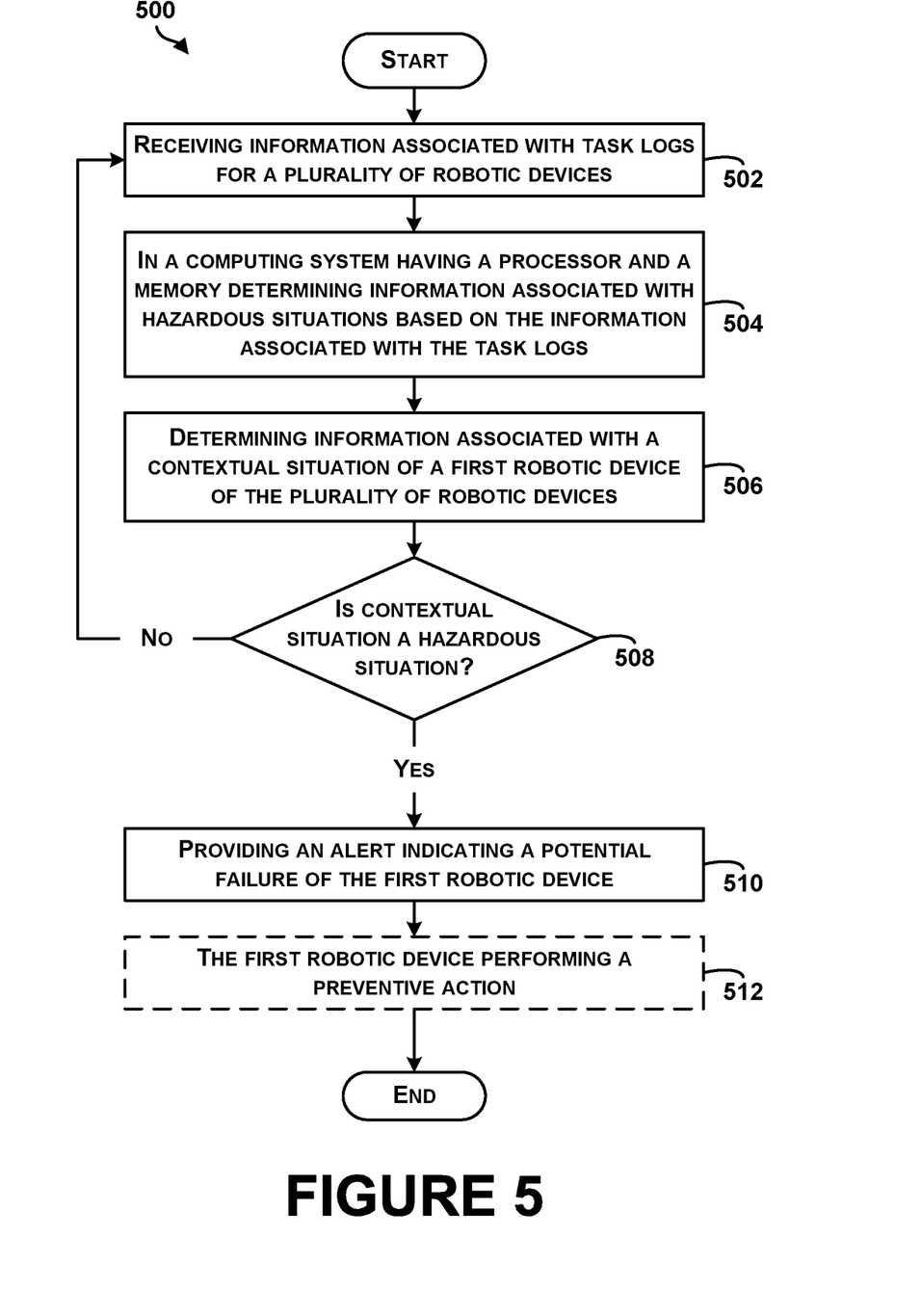
FIG. 5 is a block diagram of an example method of providing an alert of a potential failure.

FIG. 5 is a block diagram of an example method 500 of providing an alert of a potential failure. Method 500 shown in FIG. 5 presents an embodiment of a method that could be used with the system 100, for example, and may be performed by a device, such as any devices illustrated in FIGS. 1-2, or components of the devices. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

Initially, at block 502, the method 500 includes receiving information associated with task logs for a plurality of robotic devices. In one example, the plurality of robotic devices may publish task statuses, associated with tasks or functions performed by the plurality of robotic devices, to a database. Example tasks include navigating through an environment, picking up objects with different grips, transporting objects, capturing an image of an object, etc.

The information associated with task logs may be stored in a database. The database may also include information from other robotic devices similar to the robotic devices. Other types of information associated with the task logs may include information indicating a contextual situation associated with performance of a task or function. For example, the contextual situation may include information associated with an environment in which the task or function was performed or information associated with a health level of a robotic device (or component of a robotic device). In yet another example, the information associated with the tasks logs may include an indication of whether a task assigned to a robotic device was completed without error or failure, or an amount of time associated with performance of the task or function.

The information associated with the task logs may be received at a server residing in the cloud, at a computing device coupled to a robotic device, and/or at a robotic device, for example.

At block 504, the method 500 includes in a computing system having a processor and a memory determining information associated with hazardous situations based on the information associated with the task logs. In some examples, the hazardous situations may include situations associated with failures of one or more components of the plurality of robotic devices. For example, an analysis of the information associated with the tasks logs may indicate one or more tasks or environments affecting the failures. Data mining the information associated with the task logs may reveal an area where previous robotic devices may have failed (e.g., navigating around a corner of a room on a surface that provides less traction than other surfaces of the room may have caused multiple robotic devices to overturn) or a task affecting the failures (e.g., lifting an object weighing greater than a threshold amount may have resulted in stripped or slipped gears for multiple robotic devices).

In another example, information associated with a health level for the plurality of robotic devices (and/or components of the plurality of robotic devices) may be determined based on the information associated with the task logs. For example, information associated with a component of the robotic device may be received from a sensor of the robotic device. The information associated with the component may include a temperature, amount of light, amount of power draw (e.g., amount of current or amount of wattage), battery life, audio information (e.g., a decibel level or audio clip), visual information (such as images/videos etc.), among other possibilities. A health level for a given robotic device may be proportional to a current ability of the given robotic device to perform a function. In some instances, a robotic device that is new or unused may have a first level of ability; however, data mining the information associated with the task logs may indicate that at a time after the robotic device has performed the task a certain number of times, the robotic device may have a second level of ability that is lower than the first level.

For example, the first level may be associated with an ability to perform a given task repeatedly generating a result that is repeatable within a first amount of tolerance. The second level may be associated with a result that is repeatable within a second amount of tolerance that is greater than the first amount (i.e., a less precise result). In one instance, the decrease in ability may be due to wear and tear caused by previous performances of the task. Thus, the ability may change over time throughout a lifespan of the robotic device, and the current ability may be reflected in a given health level.

In some examples, the information associated with the respective health levels for the plurality of robotic devices may include or reflect an estimate of an expected remaining lifespan for one or more or each of the robotic devices. For example, based on data mining (or other types of analysis) of the information associated with the task logs, an estimate of a time of failure, need for maintenance work, etc. may be determined by the computing system. In one instance, the estimate may be a relative metric with respect to the plurality of robotic devices. In other instances, the estimate may be an absolute amount of time or a future date.

The computing system may determine the information associated with the health level for the plurality of robotic devices by querying a database and receiving the information. Alternatively, the computing system may make the determination by processing data received from the plurality of robotic devices such as to determine success and failures of completion of prior tasks.

In one instance, given the determined information associated with respective health levels for the plurality of robotic devices, information associated with respective health levels of the one or more components of the plurality of robotic devices associated with the failures may then be identified and logged.

At block 506, the method 500 includes determining information associated with a contextual situation of a first robotic device of the plurality of robotic devices. The information associated with the contextual situation may include, but is not limited to, information associated with an environment in which the first robotic device resides, operates, or is configured to operate, information associated with a task assigned to the first robotic device, and information associated with a health level for one or more components of the first robotic device.

Based on the information associated with the contextual situation and the information associated with the one or more hazardous situations, a decision may be made at block 508. In some instances, the decision at block 508 may include comparing the information associated with the contextual situation of the first robotic device with a database comprising information associated with the one or more hazardous situations. For example, an environment of the first robotic device may be compared with a list of one or more environments associated with hazardous situations. In another example, a task assigned to the first robotic device may be compared with a list of one or more tasks associated with hazardous situations. In yet another example, a health level of the first robotic device (or a component of the first robotic device) may be compared to respective health levels associated with robotic devices that have previously experienced failures.

In one example, when the information associated with the contextual situation is consistent with information associated with the one or more hazardous situations, at block 510, the method 500 may include providing an alert indicating a potential failure of the first robotic device.

In some examples, the method 500 may optionally include, at block 512, the robotic device performing a preventive action. For instance, in response to receiving the alert indicating a potential failure, the first robotic device may stop, change speed, discontinue performing a task, etc. Other examples are also contemplated.

For example, the contextual situation of the first robotic device may be such that the first robotic device has entered an area where, according to the information associated with the hazardous situations, previous robotic devices have experienced failures. Based on the comparison, an alert may be provided to the first robotic device, a user or owner of the first robotic device (e.g., by sending a message to a device of the user or owner, by the robotic device displaying or speaking the alert to the user or owner, or via other manners as well), a manager of a fleet of robotic devices including the plurality of robotic devices, etc.

In another instance, when the first robotic device is assigned a task or function that caused other similar or same robotic devices (or other robotic devices utilizing a same or similar component as a component of the first robotic device utilized for performance of the task or function) to experience failures, an alert of the potential for failure may be provided.

In another example, when the information associated with the contextual situation is not consistent with the information associated with the one or more hazardous situations, the method 500 may restart at block 502. In another example, the method 500 may restart at either block 504 or 506 (not shown) when the information associated with the contextual situation is not consistent with the information associated with the one or more hazardous situations.

In one instance, the method 500 may also include determining information associated with contextual situations of additional robotic devices of the plurality of robotic devices. Alerts may also be provided when the information associated with the contextual situations is consistent with information associated with the one or more hazardous situations. In some examples, real-time information may be received from the plurality of robotic devices. The information may include contextual situations of the plurality of robotic devices and tasks assigned to the plurality of robotic devices, for example.

In some instances, the method 500 may also include determining gradient risk scales associated with one or more environments, tasks, or contextual situations. For example, a given risk scale may be proportional to a probability of failure associated with one or more environments. As an example, the gradient risk scales may include a high risk, medium risk, and low risk scale. Other example gradients may include risk scales rated on a numerical scale (e.g., on a scale of one to ten, where one is low risk and ten is high risk). Furthermore, in some examples, if an alert is provided, the alert may indicate a risk scale associated with an environment of a robotic device (e.g., "Alert: This area is associated with a High Risk").

In some examples, the method 500 may be performed by a robotic device. For example, the robotic device may query a server for the information associated with the task logs, and receive from the server the task logs. A computing system of the robotic device may determine the information associated with the hazardous situations, receive the information associated with the contextual situation, compare the information associated with the contextual situation and the hazardous situations, and provide the alerts as needed. In one instance, the first robotic device may be the robotic device performing the method 500.

In other examples, the method 500 may be performed by a server (e.g., a server in a cloud). The information received from the plurality of robotic devices may be stored in a database. The database may include historical and/or real-time data from the plurality of robotic devices. A computing system of the server in the cloud may determine the information associated with hazardous situations, compare the information to received information associated with contextual situations, and provide the alerts as needed.

Figure 6:
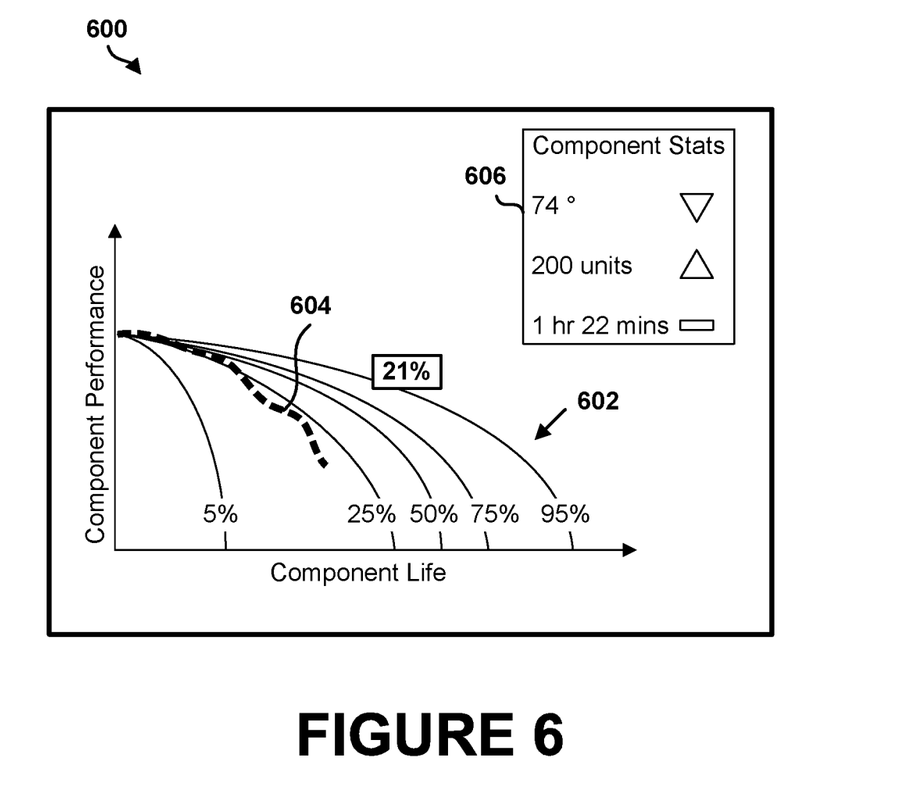
FIG. 6 is an example conceptual illustration of a display of a health level of a component of a robotic device.

In some examples, a display may be provided to a user of the robotic device or manager of a fleet of robotic devices as part of or in addition to an alert. FIG. 6 is an example conceptual illustration of a display 600 of a health level of a component of a robotic device. In one instance, an alert may indicate that robotic devices with a component performance that is less than about 25% are at risk of a potential failure when performing a given task.

As shown in FIG. 6, the display 600 may include information associated with a plurality of robotic devices. In one instance, one or more percentile curves 602 may indicate typical performance of a component versus a life of the component as determined from information associated with task logs. Additionally, the performance of the component of the robotic device may be shown by an individual curve 604 relative to performances of components of the plurality of robotic devices.

In one example, the display 600 may also include component statistics 606. The statistics 606 may be associated with performance of the component of the robotic device. Optionally, the statistics may also include a graphical indicator illustrating a relationship of the component to an average value (e.g., an upward-pointing triangle may indicate the statistic is greater than the average value, a downward-pointing triangle may indicate the statistic is less than the average value, etc.). The average value may be determined based on real-time data from the plurality of robotic devices and/or historical data associated with the plurality of robotic devices.

In some examples, the display 600 may be accessed via a web interface connected to a server in a cloud. For example, an alert may provide a link to a webpage comprising the display 600. In other examples, the display 600 may be provided on a display associated with the robotic device and configured to receive information from the server in the cloud. In one instance, the display 600 may further include information indicating on-screen alerts based on a contextual situation as determined by the server in the cloud (not shown).

Figure 7:
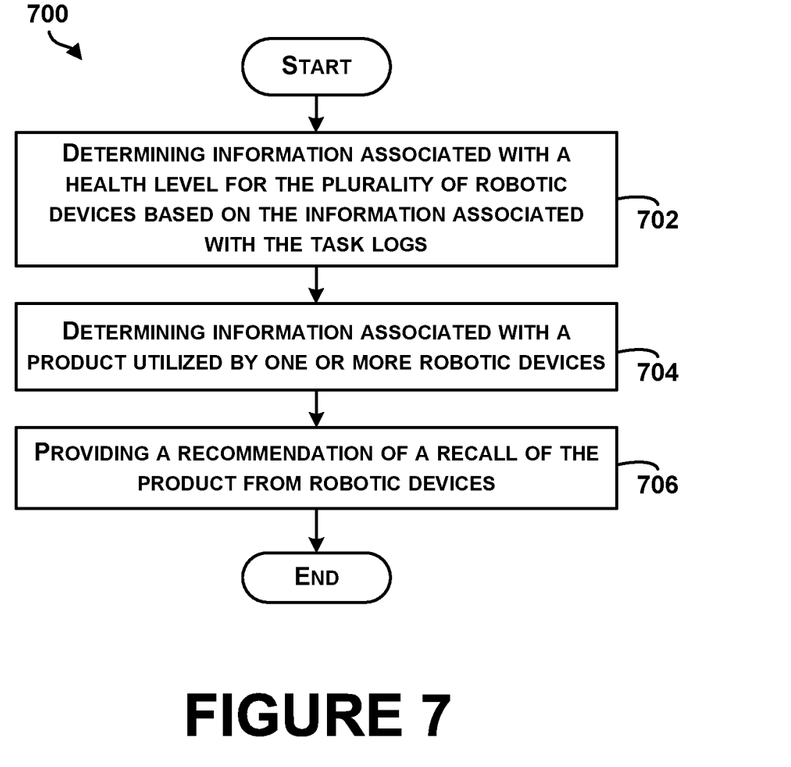
FIG. 7 is a block diagram of an example method of providing a recommendation of a recall of a product.

In some instances, the information associated with the hazardous situations may be beneficial for efficiently recalling products or components of robotic devices. FIG. 7 is a block diagram of an example method 700 of providing a recommendation of a recall. The method 700 shown in FIG. 7 presents an embodiment of a method that may, for example, be used by the system 100 of FIG. 1, and may be performed by a device, such as any devices illustrated in FIGS. 1-2, or components of the devices. Method 700 may include one or more operations, functions, or actions as illustrated by one or more of blocks 702-706. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 7 may represent circuitry that is wired to perform the specific logical functions in the process. In one example, one or more blocks 702-706 of the method 700 may be combined with the method 500 of FIG. 5.

Initially, at block 702, the method 700 includes determining information associated with a health level for the plurality of robotic devices based on the information associated with the task logs. As described above, information associated with a health level for the plurality of robotic devices (and/or components of the plurality of robotic devices) may be determined based on the information associated with the task logs. In some instances, a health level for a given robotic device may be proportional to a current ability of the given robotic device to perform a function. In other examples, the information associated with the respective health levels for the plurality of robotic devices may include or reflect an estimate of an expected remaining lifespan for one or more or each of the robotic devices.

In yet another example, the information associated with a health level for the given robotic device may include indicators or symptoms associated with a component that may be malfunctioning, in need of repair/calibration, etc. For example, a sensor associated with a component may exhibit a sensor value that is outside of a typical range for the sensor. In another instance, a component may return error messages or codes during operation, perform erratically or unexpectedly, power down unexpectedly or require rebooting, etc.

At block 704, the method 700 includes determining information associated with a product utilized by one or more robotic devices. The product utilized by the robotic device may be determined to be a product affecting failures of one or more components of the robotic devices.

For example, information associated with task logs for the plurality of robotic devices may be used determined to information associated with hazardous situations. In one instance, the information associated with the hazardous situations may reveal a common product or component utilized by one or more robotic devices of the plurality of robotic devices experiencing the failures while performing a task or a function. In a further instance, the information associated with the hazardous situations may be used to determine an average health level associated with the robotic devices experiencing the failures while utilizing the product.

In another example, information associated with a product recall may be broadcasted by a manufacturer or distributor of a product. The information may include symptoms associated with the product reported by entities experiencing problems with the product. For instance, the symptoms may have shown prior to or during a problem or failure experienced while utilizing the product.

At block 706, the method 700 includes providing a recommendation of a recall of the product from robotic devices. In the instance in which a common product or component affecting the failures is determined, a recommendation to recall the product from robotic devices utilizing the product and having similar health levels as a given health level associated with the one or more robotic devices associated with the failures may be provided.

In the instance in which information associated with a recall of a product is broadcasted, the information associated with the respective health levels for the plurality of robotic devices may be employed to provide a recommendation of a recall of the product from robotic devices utilizing the product and demonstrating similar symptoms as the reported symptoms. Thus, logging the information associated with the tasks logs and the hazardous situations may, in some examples, allow for a smart recall, such that robotic devices at risk of a failure as indicated by the demonstrated symptoms are recalled.

Figure 8:
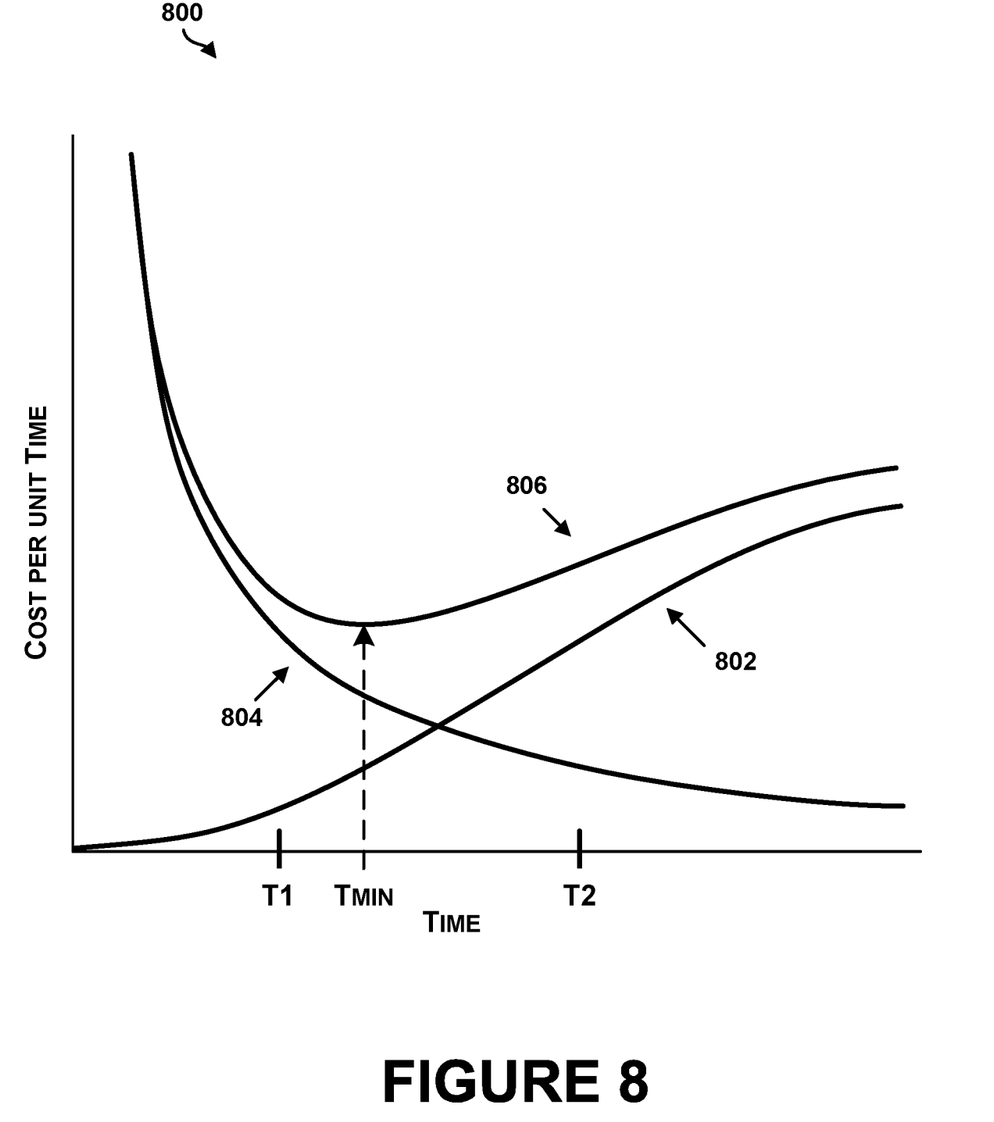
FIG. 8 is an example conceptual illustration of information associated with preventive maintenance.

FIG. 8 is an example conceptual illustration 800 of information associated with preventive maintenance. In some examples, information associated with preventive maintenance may be determined for the plurality of robotic devices. For example, the information may include a time when a component of a robotic device is scheduled to be repaired, calibrated, or replaced.

In one instance, the information associated with hazardous situations and contextual situations may be compared to the information associated with preventive maintenance. For example, data mining of the information associated with the hazardous situations may indicate that a contextual situation of a given robotic device suggests the given robotic device is at risk of a failure. For example, multiple robotic devices with a similar health level as the robotic device may have failed previously. Additionally, the information may reveal that modifying a time when the given robotic device is scheduled for preventive maintenance may alleviate the situation. In one instance, the maintenance may be performed prior to the robotic device continuing to perform a task or function. Thus, the scheduled maintenance time may be modified to reduce the risk of a potential failure.

In another instance, the information may reveal that an interval for performing preventive maintenance may be too short. For example, determining the information associated with preventive maintenance may include performing a cost-benefit analysis based on the information associated with the task logs and the information associated with the hazardous situations.

In one example, the information associated with task logs may indicate that robotic devices operating beyond a time when preventive maintenance was scheduled to occur may continue to operate without increasing a potential risk of failure. Thus, the scheduled preventive maintenance interval may be increased to reduce costs due to wasted preventive maintenance.

In another example, the information associated with the hazardous situations may be used to determine an optimal time for performing preventive maintenance replacement of a component. In some instances, data mining of the information associated with the task logs may be used to determine a failure rate of a component over time. For example, the failure rate may increase over time due to wear and tear. A component failure prior to preventive maintenance replacement of the component may be associated with corrective maintenance replacement costs (e.g., incident costs, cost of replacement, failure costs, etc.) to correct a failure. Also, preventive maintenance replacement of a component may be associated with preventive replacement costs (e.g., cost of maintenance). In many cases, the costs of preventive replacement may be less than the costs of corrective replacement.

As shown in FIG. 8, given an increasing failure rate over time, corrective replacement costs per unit time may increase over time based on an increasing likelihood of failure over time. This concept is conceptually illustrated by corrective replacement costs curve 802. Moreover, preventive replacement costs may decrease over time as shown by the preventive replacement costs curve 804. This may be explained by considering that as more time passes, fewer replacement opportunities (i.e., non-failures) may remain.

A goal of determining the optimal time for performing preventive maintenance replacement of the component may involve minimizing the sum of corrective replacement costs and preventive replacement costs per unit time. The total cost curve 806 shows example total costs of preventive maintenance replacement per unit time.

Given a failure rate over time, determined from the information associated with the task logs, a computing system may be able to determine the optimal time for performing preventive maintenance replacement. In one instance, a suggested time 'T1' may be too early with respect to an optimal time 'Tmin', such that many components are replaced before being at risk of failure leading to large preventive replacement costs. In another instance, a suggested time 'T2' may be too late with respect to the optimal time 'Tmin', such that corrective replacement costs are unnecessarily high due to a high number of failures. Thus, the scheduled time for preventive maintenance replacement may be adjusted to an earlier instance in time (such as the case of 'T2') or a later instance in time (such as the case of 'T1') in order to reduce costs.

In other examples, the information associated with hazardous situations and the information associated with the task logs may be used to determine information associated with operational ranges for the plurality of robotic devices. For example, an operational range of a component may be reduced when the information associated with the hazardous situations indicates the decrease will reduce an amount of failures of the plurality of robotic devices. In one instance, multiple robotic devices may have failed when attempting to lift an object over 10 pounds even though an operational range provided by a manufacturer indicates the robotic device is capable of lifting objects up to 12 pounds. In another example, an operational range may be increased when the information associated with the task logs indicates a number of the plurality of robotic devices have performed tasks involving performance outside of an operational range of performance provided by a manufacturer.

The operational ranges may apply to components of the robotic devices in some examples. In one instance, a manufacturer may recommend that a battery of a robotic device be replaced after an amount of time (e.g., 1 year, 200 cycles, etc.). Information associated with the task logs may indicate an average battery voltage over time versus activity of the device. A battery voltage over time versus activity of a first device may be compared to the average battery voltage over time versus activity to determine whether a battery needs to be replaced. In some instances, an alert may be provided when the comparison indicates the battery voltage characteristics of the first device are below average even though the recommended amount of time has not elapsed. In addition, the information associated with the adjusted operational ranges may be provided as feedback to manufacturers in some examples.

Although the systems and methods have been described with respect to robotic devices, the systems and methods may also be applicable to monitoring any cloud connected devices (e.g., cars, phones, tablets, etc.). Given a fleet of similar devices publishing information associated with components of the devices to a cloud, a central computing system in the cloud may be capable of monitoring status and health of the components or the devices based on historical logs of data associated with the components/devices and/or real-time data received from the devices as well as determining hazardous situations and providing alerts.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving task logs for a plurality of robotic devices, wherein the task logs comprise information indicative of tasks performed by the plurality of robotic devices;
   determining, using a computing system and based on the task logs, situations involving failure of a component of the plurality of robotic devices;
   determining, based on the situations, an updated operational range for the component of the plurality of robotic devices; and
   updating an operational range of the component of the plurality of robotic devices to be the updated operational range.

2. The method of claim 1, wherein updating the operational range to be the updated operational range increases the operational range.

3. The method of claim 1, wherein updating the operational range to be the updated operational range decreases the operational range.

4. The method of claim 1:
   wherein determining the situations comprises determining operational values of the component of the plurality of robotic devices when the situations occurred, and
   wherein determining the updated operational range for the component of the plurality of robotic devices comprises determining a reduced operational range for the component of the plurality of robotic devices that excludes one or more of the operational values.

5. The method of claim 1, wherein the operational range of the component of the plurality of robotic devices comprises an operational life of the component of the plurality of robotic devices.

6. The method of claim 1:
wherein determining the situations involving failure of the component of the plurality of robotic devices comprises determining tasks attempted by respective robotic devices when failure of the component of the plurality of robotic devices occurred, and
wherein determining the updated operational range comprises determining an updated operational range that decreases a likelihood of future failures of the component of the plurality of robotic devices.

7. The method of claim 1, wherein determining the situations involving failure of the component of the plurality of robotic devices comprises determining a common product utilized by respective robotic devices when failure of the component of the plurality of robotic devices occurred.

8. The method of claim 1, wherein the component of the plurality of robotic devices comprises a component selected from the group consisting of: a sensor, an actuator, a motor, and a battery.

9. A system comprising:
a plurality of robotic devices configured to transmit, via a network, task logs comprising information indicative of tasks performed by the plurality of robotic devices; and
a computing component, comprising a processor and a memory coupled to the processor, wherein the computing component is capable of communicating with the plurality of robotic devices over the network, the computing component configured to perform functions comprising:
receiving task logs from the plurality of robotic devices,
determining, based on the task logs, situations involving failure of a component of the plurality of robotic devices,
determining, based on the situations, an updated operational range for the component of the plurality of robotic devices, and
updating the operational range of the component of the plurality of robotic devices to be the updated operational range.

10. The system of claim 9, wherein updating the operational range to be the updated operational range increases the operational range.

11. The system of claim 9, wherein updating the operational range to be the updated operational range decreases the operational range.

12. The system of claim 9:
wherein determining the situations comprises determining operational values of the component of the plurality of robotic devices when the situations occurred, and
wherein determining the updated operational range for the component of the plurality of robotic devices comprises determining a reduced operational range for the component of the plurality of robotic devices that excludes one or more of the operational values.

13. The system of claim 9, wherein the operational range of the component of the plurality of robotic devices comprises an operational life of the component of the plurality of robotic devices.

14. The system of claim 9:
wherein determining the situations involving failure of the component of the plurality of robotic devices comprises determining tasks attempted by respective robotic devices when failure of the component of the plurality of robotic devices occurred, and
wherein determining the updated operational range comprises determining an updated operational range that decreases a likelihood of future failures of the component of the plurality of robotic devices.

15. The system of claim 9, wherein determining the situations involving failure of the component of the plurality of robotic devices comprises determining a common product utilized by respective robotic devices when failure of the component of the plurality of robotic devices occurred.

16. The system of claim 9, wherein the component of the plurality of robotic devices comprises a component selected from the group consisting of: a sensor, an actuator, a motor, and a battery.

17. A method comprising:
receiving task logs for a plurality of robotic devices, wherein the task logs comprise information indicative of tasks performed by the plurality of robotic devices;
determining, using a computing system and based on the task logs, situations involving unexpected operation of a component of the plurality of robotic devices;
determining, based on the situations, an updated operational range for the component of the plurality of robotic devices that is different from a manufacturer-specified operational range of the component; and
updating an operational range of the component of the plurality of robotic devices to be the updated operational range.

18. The method of claim 17, wherein updating the operational range to be the updated operational range increases the operational range.

19. The method of claim 17, wherein updating the operational range to be the updated operational range decreases the operational range.

20. The method of claim 17, wherein the component of the plurality of robotic devices comprises a component selected from the group consisting of: a sensor, an actuator, a motor, and a battery.

* * * * *